Aug. 16, 1960
G. J. MARIENI
2,949,515
ALTERNATING CURRENT INDUCTION DEVICE
Filed Aug. 12, 1957
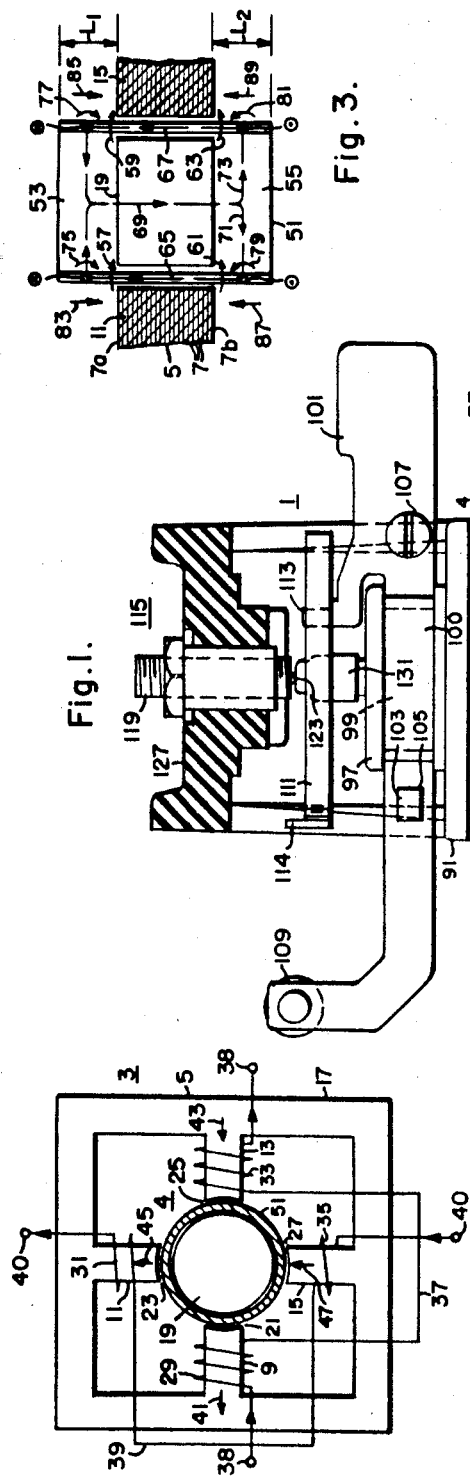
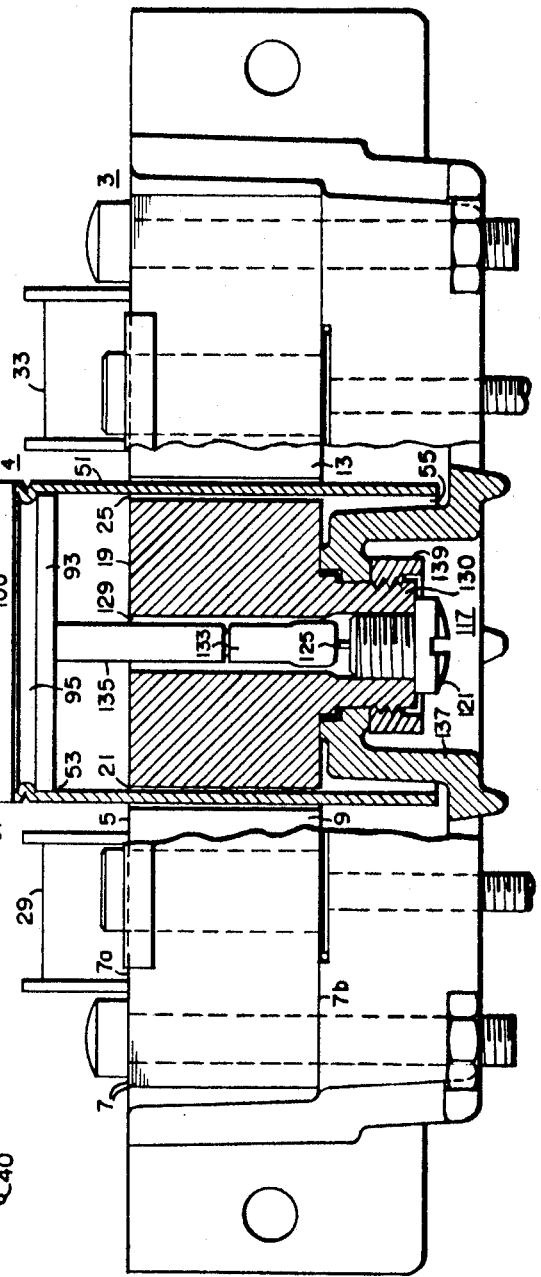
INVENTOR
Gino J. Marieni
BY
David M. Schiller
ATTORNEY

United States Patent Office 2,949,515
Patented Aug. 16, 1960

2,949,515

ALTERNATING CURRENT INDUCTION DEVICE

Gino J. Marieni, Parsippany, N.J., assignor to Westinghouse Electric Corporation, East Pittsburgh, Pa., a corporation of Pennsylvania Filed Aug. 12, 1957, Ser. No. 677,639

7 Claims. (Cl. 200—87)

This invention relates to alternating current induction devices, and has particular relation to alternating current induction relays which include a rotor structure rotatable about an axis through a shifting magnetic field.

According to the present invention, an induction device of improved construction is provided which includes a rotor structure mounted for rotation relative to an electromagnetic stator structure in response to a shifting magnetic field produced by energization of the electromagnetic structure. In the present invention, the device includes a rotor structure having an electroconductive armature configured and positioned with respect to the electromagnetic structure so that forces tending to cause undesirable vibration of the armature are substantially neutralized.

In a preferred embodiment of the invention, an alternating current induction relay is provided which includes a laminated magnetic structure having a plurality of magnetic poles spaced equally about the axis of the structure. A plurality of windings surround the magnetic poles effective when energized to establish a magnetic field which shifts about the axis.

In the present invention, the relay includes an electroconductive armature of hollow cylindrical configuration which is mounted for rotation about the axis of the magnetic structure relative to the structure under the influence of the shifting field. The armature is symmetrically positioned with respect to the magnetic structure so that forces tending to cause undesirable vibration of the armature in directions parallel to the axis are substantially neutralized.

For this purpose, the armature is located such that axial portions of the armature of substantially equal length dimensions extend beyond the end laminations of the structure. With this arrangement substantially equal forces act upon the armature tending to move the armature relative to the structure in opposing directions parallel to the axis.

The present invention further provides an improved mounting arrangement of certain parts of the relay. To this end the rotor structure includes an insulating hub having a portion positioned within the hollow of the armature in interfitting engagement with the material of the armature. A moving contact assembly is supported by a portion of the hub positioned externally of the hollow for movement with the armature to a circuit controlling position. The rotor structure is supported for rotation by suitable bearing means including portions which are supported by the insulating hub within the hollow of the armature.

It is therefore an object of the invention to provide an improved alternating current induction device.

It is another object of the invention to provide an alternating current induction relay having an electromagnetic stator structure and a rotor structure of improved formation mounted for rotation relative to the electromagnetic structure.

It is a further object of the invention to provide an induction relay including an electromagnetic stator structure and a rotor structure having an armature configured and positioned with respect to the electromagnetic structure so that forces tending to cause undesirable vibration of the armature are substantially neutralized.

It is still another object of the invention to provide an induction relay having an electromagnetic stator structure and a rotor structure including an armature of hollow cylindrical configuration symmetrically positioned with respect to the electromagnetic structure.

Other objects of the invention will become apparent from the following description taken in conjunction with the accompanying drawings in which:

Figure 1 is a view in elevation with parts shown in section and with parts removed of an induction device constructed in accordance with the invention;

Fig. 2 is a view in top plan with parts removed and with parts shown in section of the stator and rotor structures of the device of Fig. 1; and Fig. 3 is a view in elevation with parts removed and parts broken away of the device of Fig. 1 illustrating certain electrical quantities present in the device.

Referring to the drawings, there is illustrated in Fig. 1 an alternating current induction device represented generally by the numeral 1 constructed in accordance with the teachings of the invention. Although the device 1 may assume many and varied forms, it will be described as constituting an alternating current induction relay device of the directional type which responds to the direction of power in an electrical circuit (not shown).

As shown in Fig. 1, the device 1 includes an electromagnetic stator structure 3 effective when energized for establishing a shifting magnetic field for influencing a rotor structure 4. The stator structure 3 includes a magnetic structure 5 preferably formed of a plurality of identical laminations 7 constructed of a suitable magnetic material such as silicon steel. As best shown in Fig. 2, the structure 5 is formed with a plurality of magnetic poles 9, 11, 13 and 15 which are connected by a substantially square rim portion 17.

The several magnetic poles project from the inner periphery of the rim portion 17 toward the axis of the rim portion to be spaced equally about the axis. The structure 5 is conveniently formed by stacking a plurality of laminations 7 each having the configuration illustrated in Fig. 2. It is observed that the poles 9 and 13 extend along a common line which is transverse to the line along which the poles 11 and 15 extend. It is noted with reference to Fig. 1, that the several magnetic poles lie in a common plane which also includes the rim portion 17.

The stator structure 3 includes further a magnetic core 19 which is of cylindrical configuration as shown in Fig. 2. The core 19 may be formed of any suitable material such as soft iron and may be of solid or laminated construction. The core 19 is positioned in the spaces between the poles 9 and 13 and the poles 11 and 15 to define with the faces of the several poles air gaps 21, 23, 25 and 27.

In order to permit magnetization of the structure 5, a plurality of windings are positioned to surround the several magnetic poles. As shown in Fig. 2, windings 29, 31, 33 and 35 surround respectively the poles 9, 11, 13 and 15. In the directional relay under consideration, the windings 29 and 33 may be connected in series relation by a conductor 37 for energization in accordance with alternating voltage of a circuit (not shown) through terminals 38. The windings 31 and 35 are also series connected by a conductor 39 for energization through terminals 40 in accordance with alternating current of a circuit (not shown).

The voltage windings 29 and 33 are poled with respect to each other so that when energized they produce magnetic flux in the poles 9 and 13 having instantaneous directions as represented by the arrows 41 and 43. The current windings 31 and 35 are poled with respect to each other so as to produce magnetic flux having instantaneous directions in the poles 11 and 15 as indicated by the arrows 45 and 47. With this arrangement a magnetic field is produced in the several air gaps which shifts about the axis of the magnetic core 19.

The relay device also includes a rotor structure 4 which is mounted for rotation about the axis of the core 19 relative to the structure 5 under the influence of the shifting magnetic field established by energization of the structure 3. In the present invention, the rotor structure 4 includes an electroconductive armature 51 which is of improved construction. The present invention provides that the armature 51 is configured and positioned relative to the structure 5 such that forces acting between the structure 5 and the armature which tend to cause undesirable vibration of the armature are substantially neutralized.

For this purpose, the invention provides that the armature 51 is of hollow cylindrical configuration having opposed open ends 53 and 55 as best shown in Fig. 1. The armature is positioned so that portions thereof are located in the several air gaps of the structure 5 with axial portions of the armature of substantially equal length dimensions extending beyond the end laminations 7a and 7b of the structure 5. As will presently be described, such arrangement is effective to substantially neutralize forces tending to cause undesirable vibration of the armature in directions parallel to the axis of the armature.

The invention may be readily understood by inspection of Fig. 3 wherein certain electrical quantities of the device 1 are diagrammatically illustrated. In Fig. 3, it is assumed that the current windings 31 and 35 of Fig. 2 are energized to produce magnetic flux portions in the poles 11 and 15 having instantaneous directions as indicated by the arrows 57, 59, 61 and 63. The arrows 57 and 61 may represent magnetic flux portions leaving the pole 11 and entering the core 19 at upper and lower portions thereof whereas the arrows 59 and 63 may represent flux portions leaving the core 19 and entering the pole 15 at upper and lower portions thereof.

These magnetic flux portions are effective to induce voltages in the armature 51 which create currents flowing through the wall of the armature in a manner illustrated in Fig. 3. The paths traversed by these currents may be traced upwardly in the armature as indicated by the arrows 65 and 67 to points adjacent the upper end of the armature where the currents then flow away from the observer towards each other about the axis of the armature. These currents then join at the rear of the armature as viewed in Fig. 3 to flow downwardly as indicated by the arrow 69 to a point adjacent the bottom rear of the armature as viewed in Fig. 3. The currents then separate to flow about the axis of the armature in opposing directions toward the observer as indicated by the arrows 71 and 73 back to the starting points of the currents.

Current portions adjacent the upper end of the armature which flow about the axis of the armature establish magnetic flux portions having instantaneous directions as indicated by the arrows 75 and 77. Current portions adjacent the lower end of the armature which flow about the axis of the armature are effective to produce flux portions having instantaneous directions as indicated by the arrows 79 and 81. The flux portions 57 and 75 and the flux portions 59 and 77 adjacent the upper end of the armature react to establish respectively forces having instantaneous directions as indicated by the arrows 83 and 85. These forces act between the magnetic structure 5 and the armature 51 to tend to move the armature in a downwardly direction relative to the structure 5 as viewed in Fig. 3. By a similar analysis, it may be shown that forces having instantaneous directions as indicated by the arrows 87 and 89 are established which tend to move the armature 51 in an upwardly direction relative to the structure 5 as viewed in Fig. 3.

The net effect is that two resultant forces act upon the armature in opposing directions parallel to the axis of the armature. If these resultant forces have unequal magnitudes, then the armature will tend to vibrate along its axis due to the alternating nature of the net force acting upon the armature. It has been observed that the magnitudes of these resultant forces and consequently, the magnitude of the net force, depend upon the magnitudes of the electrical quantities energizing the several windings of the structure 5. As a result, vibration of the armature along its axis may become quite objectionable for large energizations of the several windings. Although only those forces established by energization of the current windings 31 and 35 have been considered in Fig. 3, it is understood that similar forces are created in response to energization of the voltage windings 29 and 33.

According to the present invention, the cylindrical armature 51 is constructed and located with respect to the structure 5 such that the two opposing resultant forces have substantially equal magnitudes whereby the resultant forces are neutralized with the result that no net force exists and no appreciable vibration of the armature along its axis occurs. To this end the cylindrical armature is positioned such that axial portions of the armature of substantially equal length dimensions protrude beyond end laminations 7a and 7b of the structure 5. In Fig. 3, the length dimensions of portions of the armature which extend beyond the end laminations are indicated by $L_1$ and $L_2$. If the armature 51 is formed with a wall having a uniform thickness dimension, and if the material of the wall has a uniform composition, then the arrangement described is effective to assure against vibration of the armature in directions parallel to its axis.

According to the present invention, an improved mounting of parts of the rotor structure is also provided. In Fig. 1, there is illustrated a hub 91 formed of any suitable insulating material which is carried by the armature for supporting the moving contact assembly of the device. In the present invention, the hub 91 is positioned in interlocking engagement with the armature to close an open end of the armature. For this purpose, the hub 91 includes a portion 93 which extends into the hollow of the armature through the open end 53. The portion 93 is formed with an annular groove 95 into which is depressed in any suitable manner material of the wall of the armature. This arrangement provides an interlocking engagement of these parts which prevents relative displacement thereof.

The moving contact assembly of the device 1 may be mounted in any suitable manner. For example, the hub 91 may include an upper portion 97 as viewed in Fig. 1 having an annular groove 99 for receiving a curved part 100 of an electroconductive contact support 101. The support 101 may be secured to the portion 97 by means of a retaining member having a curved portion (not shown) located in the groove 99 with a tab 103 extending through a slot 105 of the support 101. The retaining member and support 101 may have aligned openings (not shown) for receiving a screw member 107 to complete the securing action.

The support 101 carries a contact member 109 at an end thereof which is movable with the armature about the axis of the armature. Such movement of the contact 109 may be employed for any suitable purpose such as engaging one or more fixed contacts (not shown) to effect a desired controlling operation.

A suitable control spring 111 of spiral configuration is provided to resist rotation of the armature in a predetermined direction. The inner end of the spring 111 is conveniently secured to a portion 113 of the support 101 whereas the outer end of the spring may be fastened to a part 114 of the stator structure.

In order to support the rotor structure for rotation, a suitable bearing assembly is provided. As shown in Fig. 1, an upper bearing assembly 115 and a lower bearing assembly 117 are provided for this purpose. The assemblies 115 and 117 include respectively bearing screws 119 and 121 which support bearing pins 123 and 125. It is noted that the screw 119 is in threaded engagement with a portion 127 of the stator structure. The screw 121 is located in a central opening 129 of the core 19 in threaded engagement with a neck 130 of the core. The bearing pins 123 and 125 engage respectively bearings 131 and 133 which are carried at opposing ends of a shaft 135 which extends in a press-fit condition through an opening (not shown) of the hub 91. It is noted that the shaft 135 is supported by the hub 91 within the hollow of the armature 51 to project into the opening 129 of the core 19.

The core 19 is supported within the opening of the armature by means of a portion 137 of the stator structure. The portion 137 includes an opening through which the neck 130 of the core 19 extends. A suitable nut 139 having internal threads is in threaded engagement with the neck 130 of the core to retain the core in engagement with the portion 137.

Although the invention has been described with reference to certain modifications thereof, numerous modifications are possible and it is desired to cover all modifications falling within the spirit and scope of the invention.

I claim as my invention:

1. In an inductive relay device, a magnetic structure including a rim and a plurality of inwardly facing magnetic poles carried by said rim and having spaced inwardly facing surfaces, said poles being axially aligned with their axes lying in a medial plane, a cylindrical magnetic core, means supporting said core with its longitudinal axis extending substantially transversely to said plane and intermediate said pole surfaces and equally spaced therefrom to provide a plurality of air gaps, a hollow current conductive cylindrical member concentrically arranged with respect to said core and having its peripheral side wall in said gaps, said cylindrical member having a point intermediate its ends which divides said cylindrical member into two portions which are electrically and magnetically symmetrical, and means for rotatably supporting said cylindrcal member with said point in said medial plane.

2. In an inductive device, a flux producing structure including an outer rim, a plurality of inwardly projecting poles carried by said rim and having their inward end portions spaced from each other, a hollow cylindrical open ended current conducting sleeve having its longitudinal axis extending through said structure in the space between said poles, said sleeve having its length dimension greater than the thickness dimension of said structure, and having its opposite end portions extending substantially equal distances beyond said structure, a supporting member of insulating material secured to said sleeve, and bearing means supporting said supporting member for rotation of said sleeve about its said axis.

3. In an inductive device, a flux producing structure including an outer rim, a plurality of inwardly projecting poles carried by said rim and having their inward end portions spaced from each other, a hollow cylindrical open ended current conducting sleeve having its longitudinal axis extending through said structure in the space between said poles, said sleeve having its length dimension greater than the thickness dimension of said structure, and having its opposite end portions extending substantially equal distances beyond said structure, a supporting member of insulating material secured to said sleeve, bearing means supporting said supporting member for rotation of said sleeve about its axis, and a cylindrical magnetic core structure positioned within said sleeve and magnetically centered in said flux structure.

4. In an inductive device, a flux producing structure including an outer rim and a plurality of inwardly projecting poles, the inner end surfaces of said poles being spaced from each other to define a passageway extending through said structure and outwardly through opposite walls thereof, a cylindrical core of magnetic material positioned within said passageway and having its peripheral wall spaced from each of said pole surfaces to define air gaps, means supporting said core in fixed relation to said structure, a hollow open ended electrical conducting sleeve having its peripheral wall extending through said gaps, the internal diameter of one open end of said sleeve being greater than the external diameter of said core whereby said sleeve may be positioned in place in and removed from said structure with said core held in place by said supporting means, the length of said sleeve being greater than the distance between said opposite walls, a supporting structure of insulating material secured to said sleeve, bearing means supporting said supporting structure for rotation of said sleeve through said air gap and with said sleeve projecting equally beyond said opposite walls.

5. In an inductive device, a flux producing structure including an outer rim and a plurality of inwardly projecting poles, the inner end surfaces of said poles being spaced from each other to define a passageway extending through said structure and outwardly through opposite walls thereof, a cylindrical core of magnetic material positioned within said passageway and having its peripheral wall spaced from each of said pole surfaces to define air gaps, means supporting said core in fixed relation to said structure, a hollow open ended electrical conducting sleeve having its peripheral wall extending through said gaps, the internal diameter of one open end of said sleeve being greater than the external diameter of said core whereby said sleeve may be positioned in place in and removed from said structure with said core held in place by said supporting means, the length of said sleeve being greater than the distance between said opposite walls, a supporting structure of insulating material secured to said sleeve adjacent the end thereof opposite to said one open end, bearing means carried by said core supporting means within said sleeve for rotation of said sleeve through said air gap and with said sleeve projecting equally beyond said opposite walls, and circuit controlling means carried by said supporting structure.

6. In an inductive relay device, a magnetic structure including a rim and a plurality of inwardly facing magnetic poles carried by said rim and having spaced inwardly facing surfaces, said poles being axially aligned with their axes lying in a medial plane for said structure, a cylindrical magnetic core, means supporting said core with its longitudinal axis extending substantially transversely to said plane and intermediate said pole surfaces and equally spaced therefrom to provide a plurality of air gaps, said core having a longitudinally extending central aperture, a hollow current conductive cylindrical sleeve concentrically arranged with respect to said core and having its peripheral side wall in said gaps, said sleeve having a point intermediate its ends which divides said sleeve into two portions which are electrically and magnetically symmetrical, an insulating material supporting member for said sleeve, means securing one end portion of said sleeve to said supporting member, said supporting member having a reduced diameter cylindrical extension extending within and axially of said sleeve and extending into said core aperture, said supporting member having a cylindrical contact carrying portion positioned externally of and concentrically to said sleeve, said supporting member having a second extension on the side of said contact carrying portions opposite to said cylindrical extension, and means associated with said supporting member extensions for rotatably supporting said sleeve for rotation in said air gaps.

7. An inductive relay device comprising, a body structure, a laminated magnetic structure carried by said body member and including a peripheral rim and a plurality of inwardly facing magnetic poles carried by said rim, the inner end surfaces of said poles terminating in spaced relation to define at least partially a cylindrical passageway extending therethrough, said poles being axially aligned to define a medial plane for said structure, said passageway extending substantially perpendicularly to said plane, a cylindrical magnetic material core concentrically arranged in said passageway and cooperable with said poles to define air gaps, said body structure having a core supporting portion located in axial alignment with said passageway at one side of said plane, means securing said core to said supporting portion, said core being provided with a concentric axial chamber, a first bearing element, means supporting said bearing element concentrically of said passageway and within said chamber, a hollow current conductive cylindrical sleeve concentrically arranged relative to said passageway and having its peripheral side wall in said gaps, a supporting member of insulating material for said sleeve and located adjacent one end portion thereof, said supporting member having a first cylindrical extension concentrically arranged relative to said sleeve and extending toward the end thereof opposite to said one end portion, a second bearing element carried by said cylindrical extension and cooperable with said first bearing element to rotatably support said supporting member, said supporting member having a second cylindrical extension concentric with said first extension and located externally of said sleeve, a third bearing element carried by said supporting member in spaced relation to said second bearing element, and a fourth bearing element carried by said body structure and cooperable with said third element to rotatably support said supporting member.

References Cited in the file of this patent
UNITED STATES PATENTS

| | | |
|---|---|---|
| 1,639,507 | Johanson | Aug. 16, 1927 |
| 1,660,197 | Holte | Feb. 21, 1928 |
| 2,531,905 | Carpenter | Nov. 28, 1950 |
| 2,687,870 | Matthews | Aug. 31, 1954 |